US 9,053,581 B2

(12) United States Patent
Mueller

(10) Patent No.: US 9,053,581 B2
(45) Date of Patent: Jun. 9, 2015

(54) HIDDEN LINE GRIDS IN A BROWSER ENVIRONMENT

(75) Inventor: Eric J. Mueller, Los Gatos, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 627 days.

(21) Appl. No.: 13/343,767

(22) Filed: Jan. 5, 2012

(65) Prior Publication Data

US 2013/0176308 A1    Jul. 11, 2013

(51) Int. Cl.
  *G06T 19/20* (2011.01)
  *G06T 15/40* (2011.01)

(52) U.S. Cl.
  CPC ...... *G06T 15/40* (2013.01); *G06T 19/20* (2013.01)

(58) Field of Classification Search
  CPC ............................ G06T 2200/24; G06T 19/20
  USPC .................................. 715/848, 849; 345/419
  See application file for complete search history.

(56) References Cited

U.S. PATENT DOCUMENTS

| 6,426,745 | B1 * | 7/2002 | Isaacs et al. ............... | 345/419 |
| 6,771,276 | B1 * | 8/2004 | Highsmith et al. .......... | 345/419 |
| 8,035,635 | B2 * | 10/2011 | Shefi ......................... | 345/419 |
| 8,269,767 | B2 * | 9/2012 | Glueck et al. ............... | 345/419 |
| 2007/0206008 | A1 | 9/2007 | Kaufman et al. | |
| 2008/0055306 | A1 * | 3/2008 | Kwok et al. ................. | 345/419 |

OTHER PUBLICATIONS

Glueck, Michael, et al. "Multiscale 3D reference visualization." Proceedings of the 2009 symposium on Interactive 3D graphics and games. ACM, 2009.*
Zhai, Shumin, William Buxton, and Paul Milgram. "The partial-occlusion effect: Utilizing semitransparency in 3D human-computer interaction." ACM Transactions on Computer-Human Interaction (TOCHI) 3.3 (1996): 254-284.*

* cited by examiner

*Primary Examiner* — Kee M Tung
*Assistant Examiner* — Ryan M Gray
(74) *Attorney, Agent, or Firm* — McDermott Will & Emery LLP

(57) ABSTRACT

A method for rendering elements in a browser includes determining a first element and a line grid element to be rendered in three dimensions (3D) in the browser. The browser treats individual elements as having independent 3D spaces in the browser. The method transforms and projects the first element into a 3D space for the browser in which lines of the line grid element will be drawn. Geometry information for the first element in the 3D space is determined after the transform and projection into the 3D space. The positions are calculated in the 3D space to hide lines of the line grid element based on the geometry information for the first element and geometry information for the lines of the line grid element. The method renders lines in the 3D space in the browser, wherein portions of the lines are hidden based on the calculated positions.

15 Claims, 4 Drawing Sheets

```
              ┌302-1
        <ELEMENT 1>    ┌302-2
            <ELEMENT 2>    ┌302-3
                <ELEMENT 3>
                </ELEMENT 3>
            </ELEMENT 2>
        </ELEMENT 1>
```

HIDDEN LINE GRIDS IN A BROWSER ENVIRONMENT

BACKGROUND

Particular embodiments generally relate to three-dimensional (3D) authoring tools.

Proprietary three-dimensional (3D) authoring tools allow a user to create and render 3D elements on a display. The proprietary authoring tools allow users to place elements into a single 3D environment. For example, when the user creates an element, the element can be placed into a 3D space with other 3D elements. No transform and/or projection operations are needed to place the 3D element into the 3D environment. This is because the proprietary 3D authoring tool works in a single 3D space. The proprietary 3D authoring tools allow a user to create elements in the 3D space without any transformation and projection; however, the tool is proprietary and thus the design is not portable to other platforms. For example, if the user wants to display a created page in a different environment, the code for the page is not portable to the other environment.

When creating 3D elements in a 3D environment, it is helpful to include a line grid to enhance the visualization of the 3D elements. In one example, lines of a line grid are hidden when the lines would appear to be behind the 3D element and displayed when the lines appear to be in front of the 3D element. Including the line grid and calculating where to hide the lines in a proprietary authoring tool may be provided without transforming and projecting the placed 3D elements because the 3D elements are automatically placed in the same 3D space as the line grid. However, even though the user can use the line grid, the user is still restricted in using the proprietary authoring tool.

A web browser is a platform independent application that can be used to display 3D elements. However, the web browser treats individual 3D elements as being in independent 3D spaces. Each 3D element is independently transformed and projected in each element's own 3D space. Thus, traditional techniques for computing hidden lines cannot be performed because of multiple independent perspective projections.

SUMMARY

In one embodiment, a method for rendering elements in a browser is provided. The method includes determining a first element and a line grid element to be rendered in three dimensions (3D) in the browser. The browser is configured to treat individual elements as having independent 3D spaces in the browser. The method then transforms and projects the first element into a 3D space for the browser in which lines of the line grid element will be drawn. Geometry information for the first element in the 3D space is determined after the transform and projection into the 3D space. The one or more positions are calculated in the 3D space to hide one or more lines of the line grid element based on the geometry information for the first element and geometry information for the one or more lines of the line grid element. The method then renders the one or more lines in the 3D space in the browser, wherein portions of the one or more lines are hidden based on the calculated one or more positions.

In another embodiment, a non-transitory computer-readable storage medium containing instructions for rendering elements in a browser is provided. The instructions are for controlling a computer system to be operable to: determine a first element and a line grid element to be rendered in three dimensions (3D) in the browser, wherein the browser is configured to treat individual elements as having independent 3D spaces in the browser; transform and projecting the first element into a 3D space for the browser in which lines of the line grid element will be drawn; determine geometry information for the first element in the 3D space after the transform and projection into the 3D space; and calculate in the 3D space, one or more positions to hide one or more lines of the line grid element based on the geometry information for the first element and geometry information for the one or more lines of the line grid element; and render the one or more lines in the 3D space in the browser, wherein portions of the one or more lines are hidden based on the calculated one or more positions.

In another embodiment, an apparatus configured to render elements in a browser is provided. The apparatus includes one or more computer processors and a computer-readable storage medium comprising instructions for controlling the one or more computer processors to be operable to: determine a first element and a line grid element to be rendered in three dimensions (3D) in the browser, wherein the browser is configured to treat individual elements as having independent 3D spaces in the browser; transform and projecting the first element into a 3D space for the browser in which lines of the line grid element will be drawn; determine geometry information for the first element in the 3D space after the transform and projection into the 3D space; and calculate in the 3D space, one or more positions to hide one or more lines of the line grid element based on the geometry information for the first element and geometry information for the one or more lines of the line grid element; and render the one or more lines in the 3D space in the browser, wherein portions of the one or more lines are hidden based on the calculated one or more positions.

The following detailed description and accompanying drawings provide a more detailed understanding of the nature and advantages of the present invention.

DETAILED DESCRIPTION

Described herein are techniques for a providing a hidden line grid in a browser environment. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
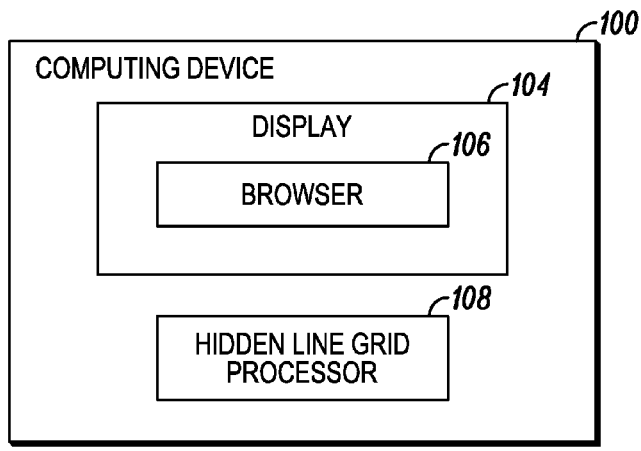
FIG. 1 depicts an example of a computing device for rendering 3D elements according to one embodiment.

FIG. 1 depicts an example of a computing device 100 for rendering 3D elements according to one embodiment. Computing device 100 includes a display 104 in which a browser 106 is used to display 3D elements. Browser 106 may be a software application that is used to display pages, such as web pages, based on a software code, such as hypertext transfer markup language (HTML) 5 or other languages that can be used to display pages in browser 106. In one embodiment, HTML5 is a universal software programming language that can be used across different computing platforms and environments.

A hidden line grid processor 108 displays a line grid in browser 106 to enhance the visualization of 3D images. For example, a user may be creating a page that includes 3D elements. A line grid is helpful to allow the user to visualize the 3D element in the page. For example, the orientation and position of the element is more easily discerned by hiding grid lines. Hidden line grid processor 108 calculates where lines of the line grid element appear to be behind the 3D element and where lines appear to be in front of the 3D element. Hidden line grid processor 108 then hides the lines that appear to be behind the 3D element.

In one embodiment, browser 106 treats elements as being in their own 3D space. That is, each 3D element needs to be transformed and projected individually when using browser 106. For example, a document object model (DOM) may be used to specify a hierarchy of elements to be included in a page to render in browser 106. Browser 106 treats each element of the DOM as being in its own individual 3D space. As described above, calculating where lines of the line grid element should be hidden cannot be performed when the elements are in their own 3D space. Accordingly, hidden line grid processor 108 transforms and projects elements of the DOM into a unified 3D space in which lines of the line grid element will be drawn. In one example, the unified 3D space is a global screen space that is pixels on the screen with depth where the 3D elements and line grid will be displayed on browser 106. In one embodiment, each element in the hierarchy of the DOM is transformed and projected at each level. This process will be described in more detail below. The elements in the unified 3D space have geometry information that defines the positions and orientations relative to each other in the unified 3D space. Hidden line grid processor 108 is then used to determine where to hide lines of the line grid element based on the geometry of the 3D elements in the unified 3D space.

Figure 2:
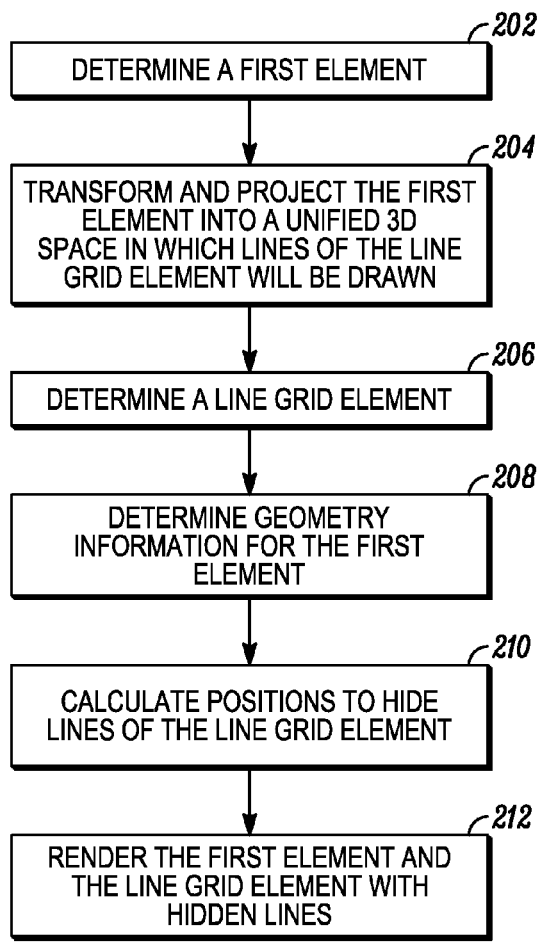
FIG. 2 depicts a simplified flowchart of a method for hiding lines in a line grid element according to one embodiment.

FIG. 2 depicts a simplified flowchart 200 of a method for hiding lines in a line grid element according to one embodiment. At 202, hidden line grid processor 108 determines a first element. The first element may be any kind of element to be rendered in browser 106, such as a different shapes, objects, etc. In one example, a user may place an element for display in a page for browser 106. At 204, hidden line grid processor 108 transforms and projects the first element into a unified 3D space in which lines of the line grid element will be drawn. This applies a 3D perspective to the first element. The elements may be based on planar two-dimensional media. A transform and projection is any method of mapping between two affine spaces and projected onto a 2 dimensional plane. An affine transformation may be a transformation that preserves straight lines (i.e., all points lying on a line initially still lie on a line after transformation) and ratios of distances (e.g., the midpoint of a line segment remains the midpoint after transformation). While an affine transformation preserves proportions on lines, it does not necessarily preserve angles or lengths. The projection then projects the mapping onto the 2D plane by applying perspective where objects farther in distance appear smaller than objects that are closer. A person skilled in the art will appreciate how to perform a transform and projection operation on an element. As will be discussed in more detail below, the first element may be part of the DOM. If the DOM is hierarchical, then multiple transforms and projections may be performed to transform the hierarchy of elements into the unified 3D space.

At 206, hidden line grid processor 108 determines a line grid element. The line grid element may be a plane in which lines will be drawn.

At 208, hidden line grid processor 108 determines geometry information for the first element. For example, the geometry information may be coordinates for the first element in the unified 3D space.

At 210, hidden line grid processor 108 calculates positions to hide the lines of the line grid element based upon the geometry information. The calculations are performed in the unified space, and a transform and projection of the line grid element does not need to be performed. In one example, hidden line grid processor 108 may draw lines on a plane for the line grid element and when a line intersects a plane of the first element and goes behind the first element, the line may be hidden until the line intersects the first element again and goes above the first element. This process may be performed for all lines of the line grid element. At 212, hidden line grid processor 108 renders the first element and the line grid element in browser 106 where the line grid element has lines hidden. The above process may be repeated as multiple elements are created in browser 106. The geometries of all elements in browser 106 may be taken into account to hide lines when multiple elements are rendered.

Figures 3, 4:
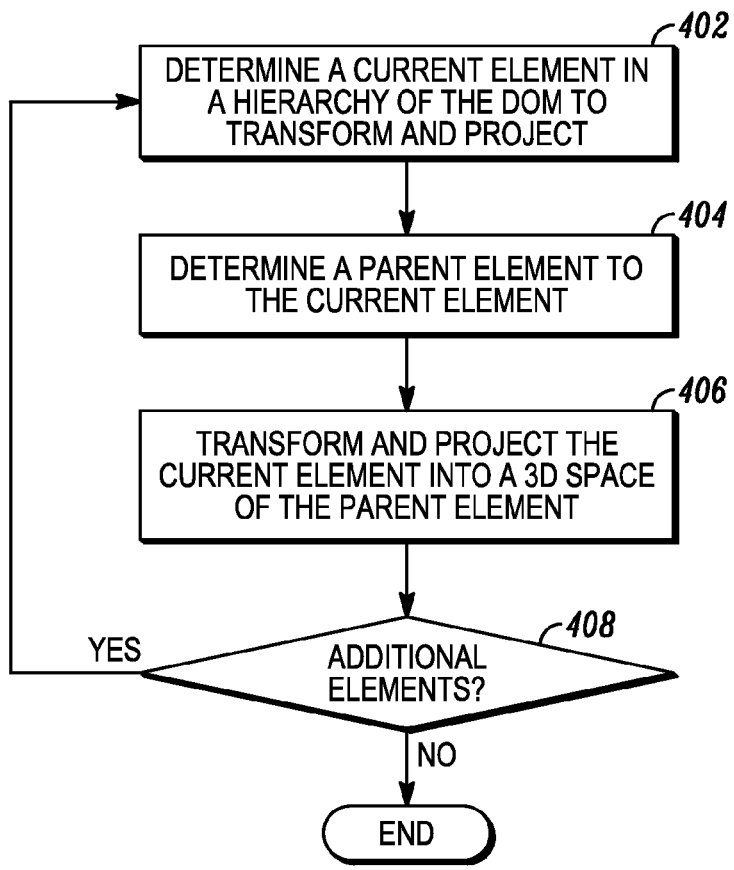
FIG. 3 shows an example of a document object model according to one embodiment.
FIG. 4, which depicts a simplified flowchart of a method for processing a hierarchy of elements the DOM according to one embodiment.

As mentioned above, the document object model may include a plurality of elements and describes the elements that are to be included in and displayed in browser 106. The document object model may be a cross platform language for representing elements to be displayed in browser 106. FIG. 3 shows an example of a document object model according to one embodiment. Elements 302 are included in a hierarchical structure. For example, element 302-3 is a child element of element 302-2. Additionally, element 302-2 is a child of element 302-1. Any number of elements may be nested in the hierarchy.

The processing of the DOM shown in FIG. 3 will be described with respect to FIG. 4, which depicts a simplified flowchart 400 of a method for processing a hierarchy of elements the DOM according to one embodiment.

At 402, hidden line grid processor 108 determines a current element in a hierarchy of the DOM to transform and project. For example, at the beginning of the process, a first element of the DOM is processed. As will be described in more detail below, each element in the hierarchy is transformed and projected.

At 404, hidden line grid processor 108 determines a parent element to the current element. For example, if element 302-3 is first determined as the current element, then element 302-2 is determined as the parent element.

At 406, hidden line grid processor 108 transforms and projects the current element into a 3D space of the parent element. For example, a 3D transform of element 302-3 is performed and the perspective is applied in the parent 3D space. A person of skill in the art will appreciate how to perform a 3D transform and apply the perspective for element 302-3 into the parent 3D space.

At 408, hidden line grid processor 108 determines if additional elements need to be processed in the hierarchy. For example, the entire hierarchy may be traversed to transform and project lower level elements into a higher level 3D space. In one example, element 302-3 has been transformed and projected into the 3D space of element 302-2. Then, elements 302-3 and 302-2 are transformed and projected into a 3D space of element 302-1. If this is the case, then the process reiterates to 402 where the current element is determined to be element 302-2. At 404, hidden line grid processor 108 determines a parent element, which is element 302-1. At 406, hidden line grid processor 108 transforms and projects elements 302-2 and 302-3 into the 3D space of element 302-1. In this case, element is 302-1 is a root element, and thus no more transforms are needed. After transform and projection at each level of the hierarchy, elements 302-1, 302-2, and 302-3 have thus been transformed and projected into a unified 3D space and a transform and projection is performed at each level of the hierarchy. The final transform and projection of each element 302 in the hierarchy is the concatenation of the transforms and projections of all of the element's parents in the hierarchy.

When no more elements exist, the process ends. The above process may be repeated at each level of the hierarchy; however, not every level of the hierarchy needs to be transformed and projected.

Figure 5:
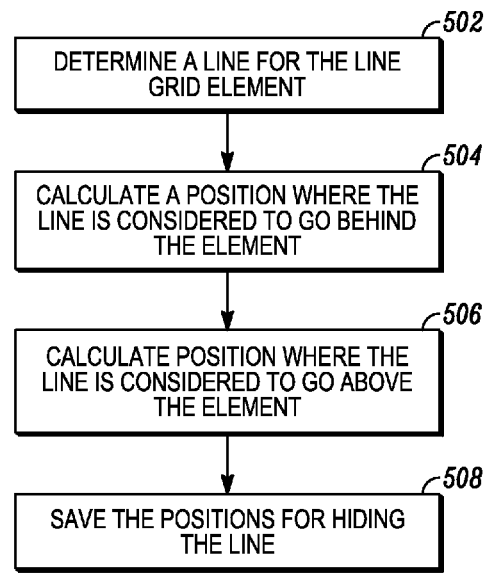
FIG. 5 depicts a simplified flowchart of a method for calculating positions for hiding lines of the line grid element according to one embodiment.

After transforming and projecting, the hierarchy of elements in the DOM into the unified 3D space in which lines for the line grid element will be drawn, calculations for hiding lines of the line grid element can be performed. Then, particular embodiments determine positions to hide lines for the line grid element. FIG. 5 depicts a simplified flowchart 500 of a method for calculating positions for hiding lines of the line grid element according to one embodiment. At 502, hidden line grid processor 108 determines a line for the line grid element. For example, a line grid element may have multiple horizontal and vertical lines. The calculation may be performed for each line to determine positions where the line should be hidden.

At 504, hidden line grid processor 108 calculates a position where the line is considered to go behind the element. For example, based on the geometry coordinates of the element, the particular position is determined that intersects a plane of the element where the line goes behind the element.

At 506, hidden line grid processor 108 calculates a position where the line considered to go above the element. For example, a position is marked where the line that has gone behind an element goes above the element. Although one element is described, multiple elements may be present in the DOM and it is determined when a line goes behind a group of elements and then goes above the group of elements.

At 508, hidden line grid processor 108 stores the positions for hiding the line. The above process then continues for each line of the line grid element. When all positions are calculated, browser 106 renders the line grid element with the hidden lines along with the elements of the DOM.

Figure 6:
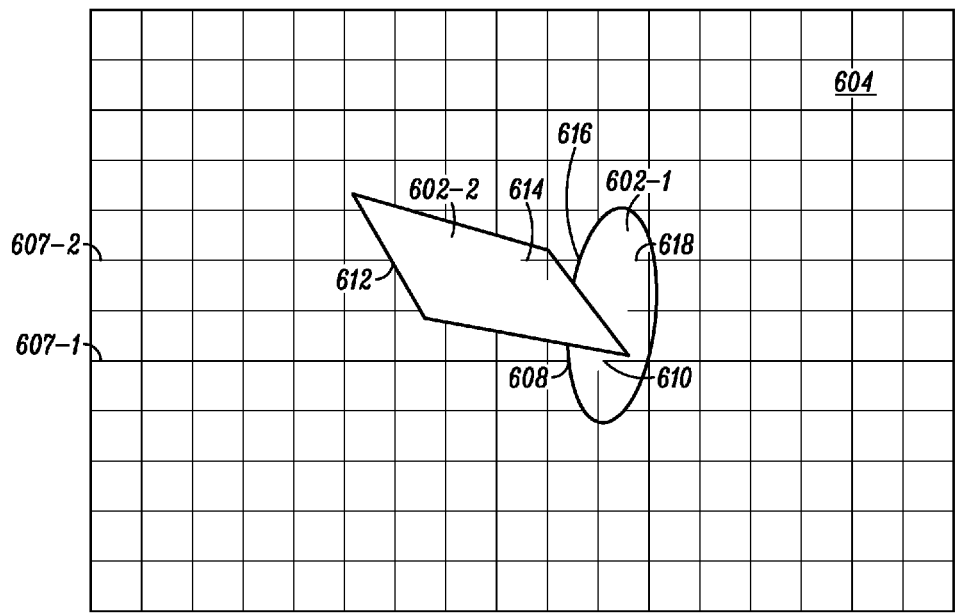
FIG. 6 depicts an example of the page that is displayed in a browser according to one embodiment.

FIG. 6 depicts an example of the page that is displayed in browser 106 according to one embodiment. An element 602-1 and an element 602-2 are included in a page 604. Additionally, a line grid element 606 with hidden lines is displayed. The hidden lines are calculated based on geometry information for both elements 602-1 and 602-2. Elements 602-1 and 602-2 have been transformed and projected into a unified 3D space.

For a first line 607-1, at a point 608, line 607-1 goes behind element 602-1. At a point 610, line 607-1 goes above element 602-1. Between points 608 and 610, line 607-1 is hidden. In this case, first line 607-1 only goes behind element 602-1. However, lines 607 may go behind both elements 602-1 and 602-2. For example, a second line 607-2 goes behind element 602-2 at a point 612. Second line 607-2 then goes above element 602-2 at a point 614. Second line 607-2 then goes behind element 602-2 at a point 616 and goes above element 602-2 at a point 618. The same process is calculated for the other lines 607.

Element 606 may also be moved to different positions in page 604. In this case, positions 608-618 may be re-calculated to hide lines 607.

Figure 7:
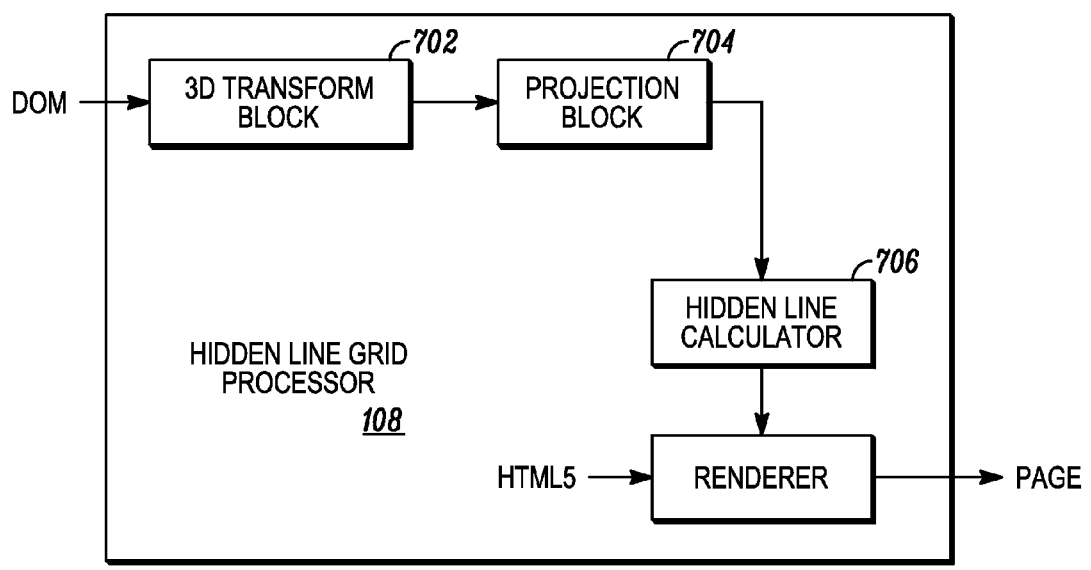
FIG. 7 depicts a more detailed example of a hidden line grid processor according to one embodiment.

FIG. 7 depicts a more detailed example of hidden line grid processor 108 according to one embodiment. A 3D transform block 702 receives the document object model. 3D transform block 702 then performs a 3D transform on an element in the document object model. A projection block 704 then projects the element into the 3D space of a parent element in the document object model. This process continues until every element of the document object model has been transformed and projected into the unified 3D space.

A hidden line calculator 706 then determines where lines should be hidden based on the geometries for the elements of the document object model. The positions to hide lines are sent to a renderer 708. Renderer 708 then receives the code, such as software code in HTML 5, for a page. Renderer 708 renders the page and uses the positions to hide lines in the page including the elements and the line grid element.

Accordingly, particular embodiments allow a browser 106 to display a line grid with hidden lines. Projections and transforms are performed on elements to transform and project them into unified space in which lines for a line grid element will be drawn. This allows hidden line grid processor 108 to calculate where lines should be hidden in the page displayed on the browser 106. Browser 106 may be cross-platform and non-proprietary. A platform independent software language is used, such as HTML5, to describe elements to render in a DOM. This allows the elements to be displayed in different platforms.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for rendering elements in a browser, comprising:

determining a first element and a line grid element to be rendered in three dimensions (3D) in the browser, wherein the browser is configured to treat individual elements as having independent 3D spaces in the browser;

transforming and projecting the first element into a 3D space for the browser in which lines of the line grid element will be drawn; wherein transforming and projecting the first element comprises:

determining, based on a document object model, a hierarchical structure of elements including the first element, wherein each element in the document object model is a 3D object associated with a respective independent 3D space in the browser; and traversing the hierarchical structure to transform and project the first element into the 3D space associated with a next element in the hierarchical structure;

determining geometry information for the first element in the 3D space after the transform and projection into the 3D space;

calculating, by a computing device, in the 3D space, one or more positions to hide one or more lines of the line grid element based on the geometry information for the first element and geometry information for the one or more lines of the line grid element; and rendering the one or more lines in the 3D space in the browser, wherein portions of the one or more lines are hidden based on the calculated one or more positions.

2. The method of claim 1, further comprising continuing to perform the traversing where lower level elements are transformed and projected into a 3D space associated with a higher level next element in the hierarchical structure.

3. The method of claim 1, wherein the traversing is performed until each element of the hierarchical structure is transformed and projected into the 3D space.

4. The method of claim 3, wherein calculating comprises:
calculating the one or more positions to hide one or more lines of the line grid element based on geometry information for all elements in the hierarchy in the 3D space.

5. The method of claim 1, wherein calculating one or more positions to hide one or more lines comprises:
determining a first point in which a line is calculated as going behind the first element in the 3D space;
determining a second point in which the line is calculated as going above the first element in the 3D space; and
hiding the line between the first point and the second point in the line grid element in the 3D space.

6. The method of claim 1, further comprising:
detecting movement of the first element in the 3D space; and
re-calculating the one or more positions to hide one or more lines of the line grid element based on the movement of the first element.

7. A non-transitory computer-readable storage medium containing instructions for rendering elements in a browser, the instructions for controlling a computer system to be operable to:
determine a first element and a line grid element to be rendered in three dimensions (3D) in the browser, wherein the browser is configured to treat individual elements as having independent 3D spaces in the browser;
transform and project the first element into a 3D space for the browser in which lines of the line grid element will be drawn; wherein transforming and projecting the first element comprises:
determining, based on a document object model, a hierarchical structure of elements including the first element, wherein each element in the document object model is a 3D object associated with a respective independent 3D space in the browser; and traversing the hierarchical structure to transform and project the first element into the 3D space associated with a next element in the hierarchical structure;

determine geometry information for the first element in the 3D space after the transform and projection into the 3D space;

calculate in the 3D space, one or more positions to hide one or more lines of the line grid element based on the geometry information for the first element and geometry information for the one or more lines of the line grid element; and render the one or more lines in the 3D space in the browser, wherein portions of the one or more lines are hidden based on the calculated one or more positions.

8. The non-transitory computer-readable storage medium of claim 7, further operable to continue to perform the traverse where lower level elements are transformed and projected into a 3D space associated with a higher level next element in the hierarchical structure.

9. The non-transitory computer-readable storage medium of claim 7, wherein the traverse is performed until each element of the hierarchical structure is transformed and projected into the 3D space.

10. The non-transitory computer-readable storage medium of claim 9, wherein calculating comprises:
calculating the one or more positions to hide one or more lines of the line grid element based on geometry information for all elements in the hierarchy in the 3D space.

11. The non-transitory computer-readable storage medium of claim 7, wherein calculating one or more positions to hide one or more lines comprises:
determining a first point in which a line is calculated as going behind the first element in the 3D space;
determining a second point in which the line is calculated as going above the first element in the 3D space; and
hiding the line between the first point and the second point in the line grid element in the 3D space.

12. The non-transitory computer-readable storage medium of claim 7, further operable to:
detect movement of the first element in the 3D space; and
re-calculate the one or more positions to hide one or more lines of the line grid element based on the movement of the first element.

13. An apparatus configured to render elements in a browser, the apparatus comprising:
one or more computer processors; and
a computer-readable storage medium comprising instructions for controlling the one or more computer processors to be operable to:
determine a first element and a line grid element to be rendered in three dimensions (3D) in the browser, wherein the browser is configured to treat individual elements as having independent 3D spaces in the browser;
transform and projecting the first element into a 3D space for the browser in which lines of the line grid element will be drawn; wherein transforming and projecting the first element comprises:
determining, based on a document object model, a hierarchical structure of elements including the first element, wherein each element in the document object model is a 3D object associated with a respective independent 3D space in the browser; and traversing the hierarchical structure to transform and project the first element into the 3D space associated with a next element in the hierarchical structure;

determine geometry information for the first element in the 3D space after the transform and projection into the 3D space;

calculate in the 3D space, one or more positions to hide one or more lines of the line grid element based on the geometry information for the first element and geometry information for the one or more lines of the line grid element; and render the one or more lines in the 3D space in the browser, wherein portions of the one or more lines are hidden based on the calculated one or more positions.

14. The apparatus of claim 13, further operable to continue to perform the traverse where lower level elements are transformed and projected into a 3D space associated with a higher level next element in the hierarchical structure.

15. The apparatus of claim 13, wherein the traverse is performed until each element of the hierarchical structure is transformed and projected into the 3D space.

* * * * *